(12) United States Patent
Lang

(10) Patent No.: US 11,114,077 B2
(45) Date of Patent: Sep. 7, 2021

(54) CHROMATIC-EMPHASIS HYBRID-DIATONIC LEVERLESS KEYBOARD

(71) Applicant: Charles Lang, Sacramento, CA (US)

(72) Inventor: Charles Lang, Sacramento, CA (US)

( * ) Notice: Subject to any disclaimer, the term of this patent is extended or adjusted under 35 U.S.C. 154(b) by 0 days.

(21) Appl. No.: 16/780,809

(22) Filed: Feb. 3, 2020

(65) Prior Publication Data
US 2020/0258488 A1    Aug. 13, 2020

Related U.S. Application Data

(60) Provisional application No. 62/803,072, filed on Feb. 8, 2019.

(51) Int. Cl.
| | | |
|---|---|---|
| *G10H 1/34* | (2006.01) | |
| *G09B 15/08* | (2006.01) | |
| *G10C 3/12* | (2006.01) | |

(52) U.S. Cl.
CPC ............ *G10H 1/344* (2013.01); *G09B 15/08* (2013.01); *G10C 3/12* (2013.01)

(58) Field of Classification Search
CPC ........... G10H 1/344; G09B 15/08; G10C 3/12
See application file for complete search history.

(56) References Cited

U.S. PATENT DOCUMENTS

| | | | | |
|---|---|---|---|---|
| 215,208 A | * | 5/1879 | Cadot ...................... | G10C 3/12 84/440 |
| 315,724 A | * | 4/1885 | Casey .................... | G09B 15/08 84/467 |
| 334,484 A | * | 1/1886 | Stewart .................... | G10C 3/12 84/428 |
| 360,255 A | * | 3/1887 | von Janko ............... | G10C 3/12 84/428 |
| 682,014 A | * | 9/1901 | Adams ..................... | G10C 3/12 84/428 |
| 732,688 A | * | 6/1903 | Harmon ................... | G10C 3/12 84/427 |
| 756,016 A | * | 3/1904 | Harriss et al. ........... | G10C 3/12 84/440 |
| 835,580 A | * | 11/1906 | Taylor ..................... | G10C 3/12 84/451 |
| 860,489 A | * | 7/1907 | Kuba ....................... | G10C 3/12 84/427 |
| 888,100 A | * | 5/1908 | Kuba ....................... | G10C 3/12 84/427 |
| 1,421,464 A | * | 7/1922 | Hans ....................... | G10C 3/12 84/424 |
| 1,644,960 A | * | 10/1927 | Stauss .................... | G09B 15/08 84/479 R |

(Continued)

*Primary Examiner* — Robert W Horn
(74) *Attorney, Agent, or Firm* — Christopher Pilling

(57) ABSTRACT

The present invention is a chromatic-emphasis hybrid-diatonic leverless keyboard configured to provide an extension, duplication, or representation of both heptatonic and pentatonic keys on the leverless keyboard. The extension enables the user to shift the physiological center of gravity for the keyboard to the area where pentatonic and heptatonic keys share space and are more isomorphic, thus assisting in gaining and applying understanding of the chromatic equality of the twelve tonalities in standard equal temperament, and in gaining and applying understanding of the one-dimensional nature of music.

16 Claims, 3 Drawing Sheets

(56) References Cited

U.S. PATENT DOCUMENTS

| | | | | |
|---|---|---|---|---|
| 2,097,280 A * | 10/1937 | House | G10C 3/12 84/451 |
| 2,203,393 A * | 6/1940 | Reuther | G10D 11/02 84/428 |
| 2,456,575 A * | 12/1948 | Young | G10C 3/12 84/427 |
| 2,557,690 A * | 6/1951 | Reuther | G10C 3/12 84/423 R |
| 2,706,926 A * | 4/1955 | Young | G10D 1/12 84/451 |
| 3,141,371 A * | 7/1964 | Coles | G10H 1/34 84/448 |
| 3,915,050 A * | 10/1975 | Hak | G10C 3/12 84/175 |
| 3,943,811 A * | 3/1976 | Coles | G10C 3/12 84/678 |
| 4,054,079 A * | 10/1977 | Sohler | G10C 3/12 84/423 R |
| 4,362,934 A * | 12/1982 | McLey | G10C 3/12 250/229 |
| 4,365,536 A * | 12/1982 | Koepke | G10C 3/12 84/433 |
| 4,510,839 A * | 4/1985 | Kumano | G10H 1/344 84/434 |
| 5,233,899 A * | 8/1993 | Nakagome | G10C 3/12 84/423 R |
| 5,404,788 A * | 4/1995 | Frix | G10C 3/12 84/423 R |
| 6,087,575 A * | 7/2000 | Niitsuma | G10H 1/344 84/423 R |
| 6,194,646 B1 * | 2/2001 | Kowalski | G10C 3/12 84/423 R |
| 6,566,593 B2 * | 5/2003 | Pertchik | G09B 15/02 84/423 R |
| 7,253,349 B1 * | 8/2007 | Saltsman | G10C 3/12 84/423 R |
| 7,605,319 B2 * | 10/2009 | Komatsu | G10C 3/12 84/423 R |
| 7,667,119 B1 * | 2/2010 | Schlapkohl | G10H 1/32 84/424 |
| 7,767,892 B2 * | 8/2010 | Osuga | G10C 3/12 84/423 R |
| 8,735,706 B2 * | 5/2014 | Mathews | G10C 3/12 84/423 R |
| 8,802,952 B2 * | 8/2014 | Osuga | G10H 1/344 84/439 |
| D776,188 S * | 1/2017 | Beck | D17/1 |
| 2020/0258488 A1 * | 8/2020 | Lang | G10H 1/344 |

* cited by examiner

CHROMATIC-EMPHASIS HYBRID-DIATONIC LEVERLESS KEYBOARD

CROSS-REFERENCE TO RELATED APPLICATIONS

The present application claims priority to U.S. Provisional Patent Application Ser. No. 62/803,072 filed on Feb. 8, 2019 entitled "Shifted Center Musical Keyboard", the disclosure of which is hereby incorporated in its entirety at least by reference.

BACKGROUND OF THE INVENTION

1. Field of the Invention

The present invention generally relates to musical devices but more particularly to a chromatic-emphasis hybrid-diatonic leverless keyboard.

2. Description of Related Art

Both the chromatic equality of the twelve tonalities in standard equal temperament, and the one-dimensional nature of music (as rt can be for example understood on successive frets of a single string of a guitar) are difficult to perceive and employ in association with a standard keyboard. Students usually begin by using the heptatonic keys ("the white keys", pressed most easily in their front region, and also often viewed as having their psychological center of gravity in that region), and so as they progress and add notes from the pentatonic keys ("the black keys", perceived as having their center of gravity farther toward the rear), a perception is created combining vertical (front-rear, longitudinal) and horizontal (left-right, latitudinal) elements. They get a zig-zag understanding, thinking of for example a jump rising in pitch from F-sharp to C as a diagonal move to the right and away from the back of the instrument. Transposition of a passage, which helps to understand the chromatic equality of the twelve tonalities in standard equal temperament, involves reassigning the relationships in awkward ways that are dependent on the contingencies of the standard keyboard layout. For example, the relationship between F-sharp and C (a tritone), transposed a semitone higher, becomes a diagonal movement to the right and toward the back of the instrument, rather than away from it (G to C-sharp). Transposed higher by an interval of a fourth, the e becomes purely a lateral movement (B to F) with no vertical component. In a one-dimensional understanding as for example on a single string of a guitar, the tritone can be grasped much more intuitively because in every case it is simply a movement of six frets. The ability to transpose passages immediately and without deliberation is viewed as basic in some circles of advanced keyboardists; the goal of the invention is to help make this skill easier to obtain.

Piano teachers sometimes direct students to focus on the rear portion of the keyboard, where white (the heptatonic scale) and black (pentatonic scale) share space and their similar width offers some isomorphism. When this region is thought of along the lateral axis, it helps to see musical sequences one-dimensionally. However this offers only limited help and initial impressions psychologically anchoring the heptatonic keys in the front region of the instrument can be extremely difficult to erase or modify. A one-dimensional, or purely linear lining up of all notes is called chromatic, while an arrangement that privileges a heptatonic sequence is called diatonic. For this reason a standard keyboard can be called a hybrid diatonic keyboard, because the rear portion lines up the notes in a largely one-dimensional way while the front portion presents a heptatonic sequence.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, a keyboard is provided, comprising a front side; a rear side; a plurality of heptatonic keys; a plurality of pentatonic keys; and, the keyboard being symmetric such that a horizontal center line of the keyboard is situated in the center of both the plurality of heptatonic keys and the plurality of pentatonic keys.

In one embodiment, the plurality of heptatonic keys and the plurality of pentatonic keys are leverless, such that when a user depresses a key of the plurality of heptatonic keys and/or the plurality of pentatonic keys the entire key depresses simultaneously without pivoting.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

It should be noted that the drawings provided are not to scale and represent portions of a leverless keyboard.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a chromatic-emphasis hybrid-diatonic leverless keyboard.

Figure 1:
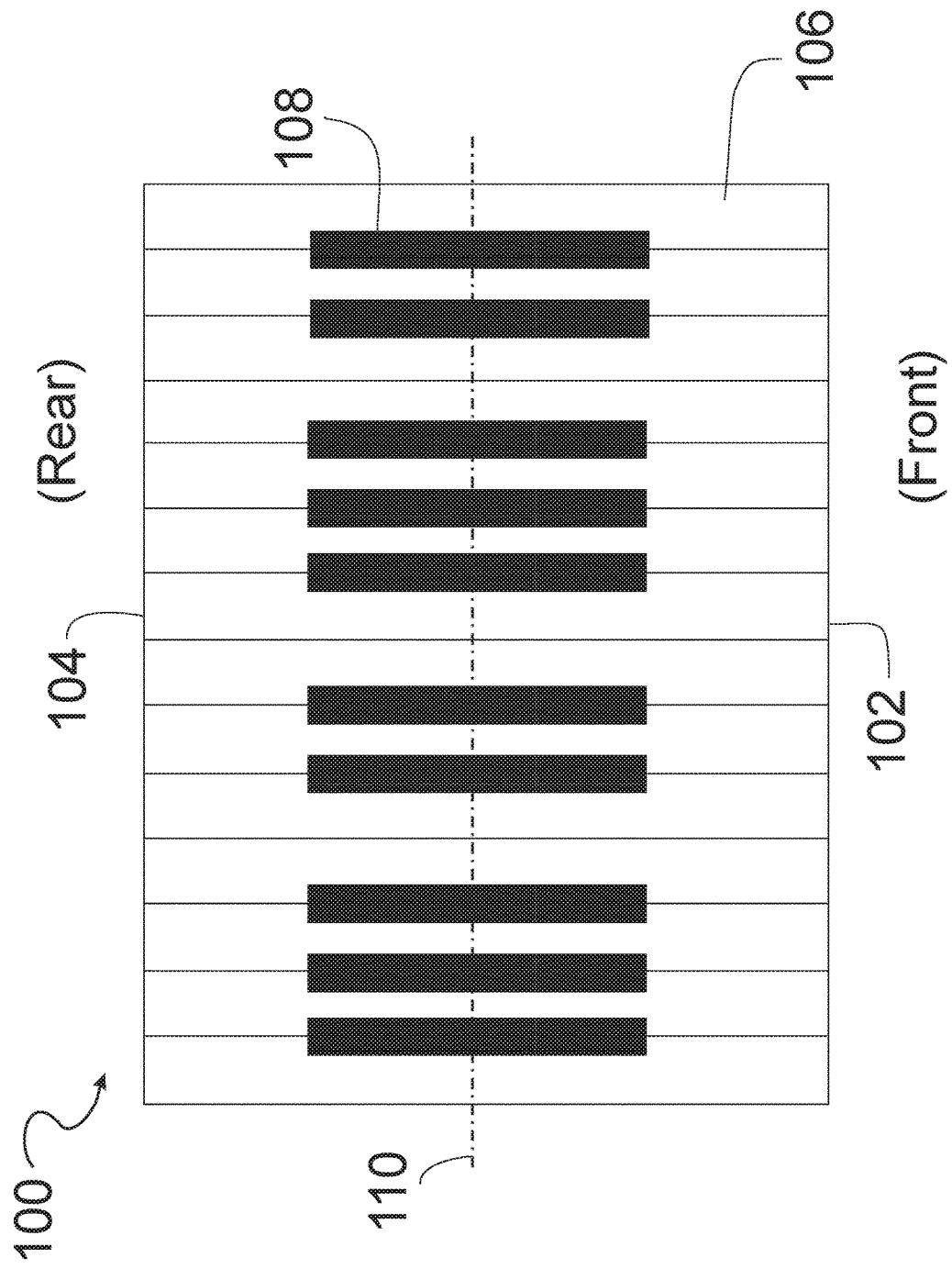
FIG. 1 is top view of a leverless keyboard according to an embodiment of the present invention.

FIG. 1 is top view of a leverless keyboard 100 according to an embodiment of the present invention. Referring now to FIG. 1, the leverless keyboard is illustrated. In one embodiment, the leverless keyboard comprises a front side 102 and a rear side 104. The user is preferably situated at the front side 102 when playing the leverless keyboard. The leverless keyboard further comprises a plurality of heptatonic keys 106, i.e. white keys, as well a plurality of pentatonic keys 108, i.e. black keys.

It is a particular advantage of the present invention to provide an extension, duplication, or representation of the keys, both the heptatonic and pentatonic keys as illustrated. For instance, center line 110 may represent the rear end of a keyboard of the prior art. The extension as illustrated enables the user to shift the physiological center of gravity for the keyboard to the area where pentatonic and heptatonic keys share space and are more isomorphic, thus assisting in gaining and applying understanding of the chromatic equality of the twelve tonalities in standard equal temperament, and in gaining and applying understanding of the one-dimensional nature of music.

In simple terms, the present invention provides a means for a user to learn how to play the piano easier, and specifically on the mental side of understanding the conceptual nature of music. As, both the chromatic equality of the twelve tonalities in standard equal temperament, and the one-dimensional nature of music (as it can be for example understood on successive frets of a single string of a guitar) are difficult to perceive and employ in association with a standard keyboard. Students usually begin by using the heptatonic keys, pressed most easily in their front region, and also often viewed as having their psychological center of gravity in that region, and so as they progress and add notes from the pentatonic keys, perceived as having their center of gravity farther toward the rear, a perception is created combining vertical (front-rear, longitudinal) and horizontal (left-right, latitudinal) elements. Piano students get a zig-zag understanding, thinking of for example a jump rising in pitch from F-sharp to C as a diagonal move to the right and away from the back of the instrument. Transposition of a passage, which helps to understand the chromatic equality of the twelve tonalities in standard equal temperament, involves reassigning the relationships in awkward ways that are dependent on the contingencies of the standard keyboard layout. For example, the relationship between F-sharp and C (a tritone), transposed a semitone higher, becomes a diagonal movement to the right and toward the back of the instrument, rather than away from it (G to C-sharp). Transposed higher by an interval of a fourth, the tritone becomes purely a lateral movement (B to F) with no vertical component. In a one-dimensional understanding, as for example on a single string of a guitar, the tritone can be grasped much more intuitively because in every case it is simply a movement of six frets.

Piano teachers sometimes direct students to focus on the rear portion of the keyboard, where white (the heptatonic scale) and black (pentatonic scale) share space and their similar width offers some isomorphism. When this region is thought of along the lateral axis, it helps to see musical sequences one-dimensionally. However this offers only limited help and initial impressions psychologically anchoring the heptatonic keys in the front region of the instrument can be extremely difficult to erase or modify.

In another aspect of the invention, the keys (106 and 108) are leverless. Leverless is defined as "without pivot, wherein both the front and rear portions of the key depress in unison regardless of the location of the pressing." This is similar to a space bar on a computer keyboard. The leverless nature of the keys assist in shifting the psychological center of gravity as previously discussed.

In another aspect of the invention, the widths of all keys in the chromatic region are held equal, while the widths in the heptatonic region vary. The opposite is the case on a standard keyboard, which holds the widths of the wide front parts of the white keys equal while spacing of keys varies in the rear portion (five notes fit in the space of C to E while seven fit into the space of F to B, resulting in different fractions of ⅗ and 4/7 respectively).

Figure 2:
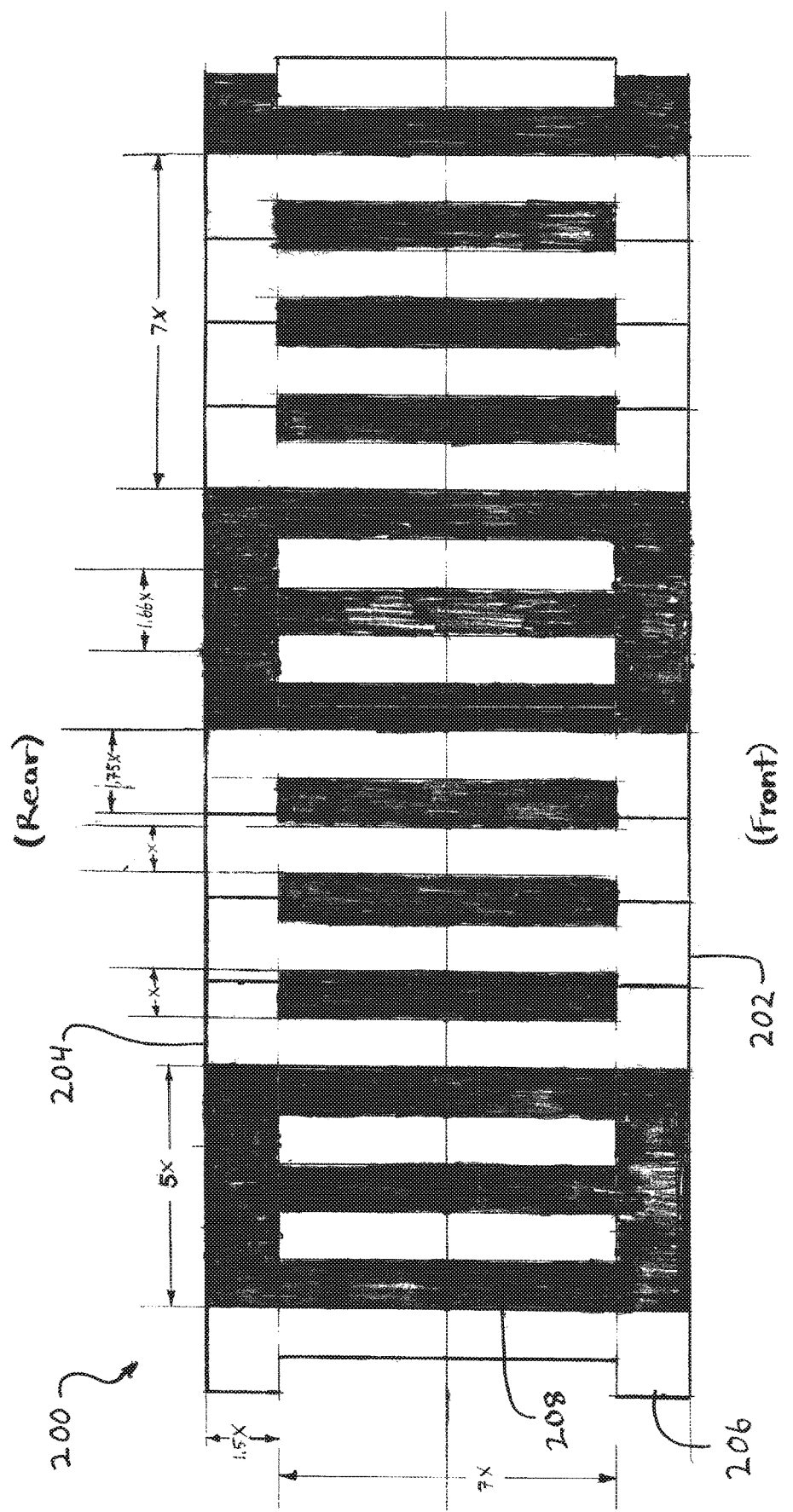
FIG. 2 a top view of an alternative leverless keyboard according to an embodiment of the present invention.

In another aspect of the invention, the chromatic region is enlarged (the keys lengthened) or its proportion in the overall appearance of the keyboard is enlarged by reducing the proportion of the heptatonic region. This again serves to emphasize the chromatic aspect. In the preferred embodiment this is achieved by making the heptatonic region (the area with wide keys) than on a standard keyboard, or at least shorter on the front or rear when front and rear portions are not considered added together. FIG. 2 illustrates one example of dimensions for the present invention, wherein x is the width of any note in its chromatic region.

In another aspect of the invention, the keys for the highest and lowest notes are of the same chromatic width in the chromatic region as other keys, again serving to emphasize the chromatic character in the keyboard. In a standard keyboard the highest note if C or F is wide its full length. This aspect is shown in FIG. 2.

In another aspect of the preferred embodiment of the invention, the highest and/or lowest notes are in the pentatonic sequence, as shown in FIG. 2. This again serves to emphasize the chromatic character in the keyboard, because it de-emphasizes the heptatonic (diatonic) sequence. Standard keyboards end on notes in the diatonic sequence, such as A and C. In alternative embodiments, the highest and lowest notes are not both in the pentatonic sequence.

In another aspect of the invention in the embodiment shown in FIG. 2, the colors of keys (but not the shapes or relief) from C to E are inverted. This again serves to emphasize the chromatic character in the keyboard because it de-emphasizes the heptatonic (diatonic) sequence. (In simple terms it makes the keys that are white on a standard keyboard less privileged). In this aspect, the keys alternate white-black throughout the keyboard instead of placing twice per octave two adjacent white keys as with a standard keyboard. C# and D# remain physically raised just as in a standard keyboard.

In another aspect of the invention, the heptatonic keys have wide regions at the rear which visually balance their wide regions in the front, drawing the user's attention over into the chromatic region, again in order to emphasize the chromatic character in the keyboard. This aspect is shown in FIG. 1 and FIG. 2.

As previously mentioned, FIG. 2 shows one exemplary embodiment illustrating dimensions for a top view of an alternative leverless keyboard 200 according to an embodiment of the present invention. Referring now to FIG. 2, in this embodiment, the alternate leverless keyboard comprises a front side 202 and a rear side 204. The user is preferably situated at the front side 202 when playing the leverless keyboard. The alternative leverless keyboard 200 further comprises a plurality of heptatonic keys 206, as well a plurality of pentatonic keys 208. Regarding the dimensions, x is the width of any note in its chromatic region. Among the heptatonic keys, C, D and F are 1.66x or 5⁄3x wide, and F, G, A and B are 11.75x or 7⁄4x wide, and the distance from the front or rear to on the onset of the chromatic region is 1.5x. In this embodiment, the lowest note is B and the highest is C#.

Figure 3:
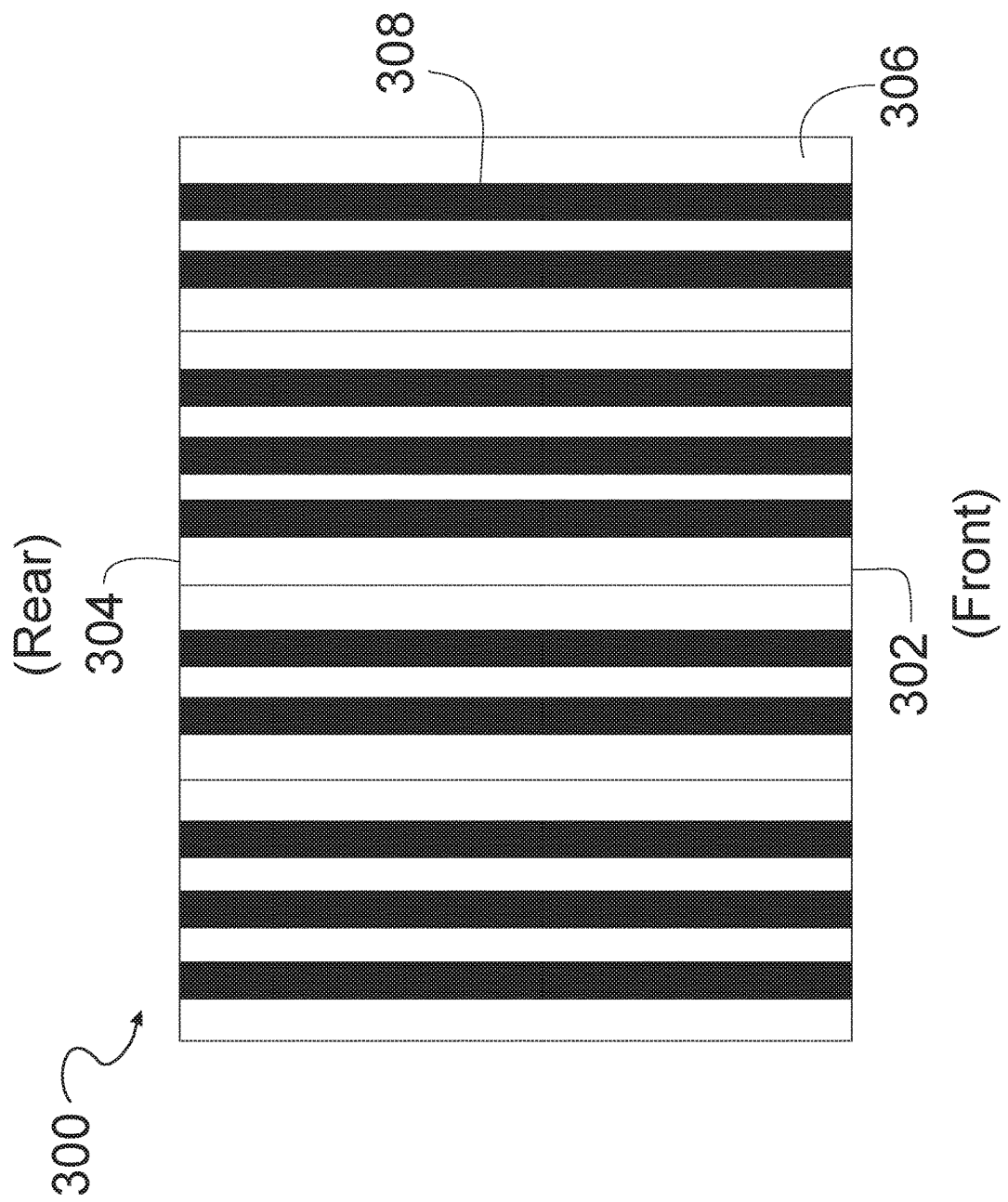
FIG. 3 a top view of a second alternative leverless keyboard according to an embodiment of the present invention.

FIG. 3 a top view of a second alternative leverless keyboard 300 according to an embodiment of the present invention. Referring now to FIG. 3, the second alternate leverless keyboard comprises a front side 302 and a rear side 304. The user is preferably situated at the front side 302 when playing the leverless keyboard. The second alternative leverless keyboard 300 further comprises a plurality of heptatonic keys 206, as well a plurality of pentatonic keys 308. In this embodiment, the pluralities of the heptatonic and pentatonic keys are of the same length and width throughout the keyboard.

As previously mentioned, FIGS. 1-3 are not to scale and show only a portion of the keyboard, i.e. more keys, both heptatonic keys and pentatonic keys may be provided. Also, the keyboard described and illustrated is intended as an electronic keyboard, digital keyboard, electrical piano, or similar wherein the depression of one or more keys sends an electronic audio signal to an electronic amplifier (not shown) which is configured to produce the desired note of the depressed key through one or more speakers (not shown). The keyboard further comprises a housing (not shown) configured to house the electric components and keyboard. Also, the keyboard comprises at least one power source, such as batteries or a power cord configured to be plugged into a wall outlet. Other common features found in typical electronic keyboards may be provided. These are outside the scope of the invention. It should be understood, that any electronic or mechanical component necessary for the invention's operation is provided, as well known in the art. For instance, in some embodiments, memory, ram, and a computer programing unit may be provided. If required, the necessary components to enable one of skilled in the art to produce an electric instrument (piano) using the disclosed keyboard may be found in any of electronic keyboard patents, such as U.S. Pat. Nos. 7,544,877B2, 5,552,560A, 212,646A, wherein these references are hereby included in their entirety at least by reference. Further, in some embodiments, the keyboard provided may be a component in an acoustic instrument. In this embodiment, it is understood that any necessary component required for use is provided.

Although, the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A keyboard comprising:
    a first heptatonic region comprising a first plurality of heptatonic operational surfaces;
    a chromatic region comprising a plurality of pentatonic operational surfaces and a second plurality of heptatonic operational surfaces;
    a second heptatonic region comprising a third plurality of heptatonic operational surfaces;
    wherein the chromatic region is positioned between the first heptatonic region and second heptatonic region; and,
    wherein the first plurality of heptatonic operational surfaces, the second plurality of heptatonic operational surfaces, and the third plurality of heptatonic operational surfaces are connected and not raised.

2. The keyboard of claim 1, wherein each operational surface is, and any connected operational surface is, configured so that all parts depress in unison regardless of the location of pressing.

3. The keyboard of claim 1, wherein the plurality of pentatonic operational surfaces and the second plurality of heptatonic operational surfaces in the chromatic region occupy locations spaced equally along the lateral axis.

4. The keyboard of claim 1, wherein the first plurality of heptatonic operational surfaces comprise a first length, the operational surfaces in the chromatic region comprise an average width and the first length is less than three times that average width.

5. The keyboard of claim 1, wherein the operational surfaces in the chromatic region comprise keys of two colors such that in the chromatic region no key lies next to another key of the same color.

6. A keyboard comprising:
    a front side;
    a first heptatonic region comprising a first plurality of heptatonic operational surfaces positioned at the front side;
    a chromatic region comprising a plurality of pentatonic operational surfaces and a second plurality of heptatonic operational surfaces;
    wherein the first plurality of heptatonic operational surfaces and the second plurality of heptatonic operational surfaces are connected; and
    wherein each operational surface is, and any connected operational surface is, configured so that all parts depress in unison regardless of the location of pressing; and,
    wherein no pentatonic operational surfaces are positioned at the front side.

7. The keyboard of claim 6, wherein the plurality of pentatonic operational surfaces and the second plurality of heptatonic operational surfaces in the chromatic region occupy locations spaced equally along the lateral axis.

8. The keyboard of claim 6, wherein the first plurality of heptatonic operational surfaces comprise a first length, the operational surfaces in the chromatic region comprise an average width and the first length is less than than three times that average width.

9. The keyboard of claim 6, wherein the operational surfaces in the chromatic region comprise keys of two colors such that in the chromatic region no key lies next to another key of the same color.

10. A keyboard comprising:
a first heptatonic region comprising a first plurality of heptatonic operational surfaces;
a chromatic region comprising a plurality of pentatonic operational surfaces and a second plurality of heptatonic operational surfaces;
wherein the first plurality of heptatonic operational surfaces and the second plurality of heptatonic operational surfaces are connected;
wherein the first plurality of heptatonic operational surfaces comprise a first length, the operational surfaces in the chromatic region comprise an average width and the first length is less than three times that average width.

11. The keyboard of claim 10, wherein the plurality of pentatonic operational surfaces and the second plurality of heptatonic operational surfaces occupy locations spaced equally along the lateral axis.

12. The keyboard of claim 10, wherein the operational surfaces in the chromatic region comprise keys of two colors such that in the chromatic region no key lies next to another key of the same color.

13. The keyboard of claim 10, wherein each operational surface is, and any connected operational surface is, configured so that all parts depress in unison regardless of the location of pressing.

14. A keyboard comprising:
a first heptatonic region comprising a first plurality of heptatonic operational surfaces;
a chromatic region comprising a plurality of pentatonic operational surfaces and a second plurality of heptatonic operational surfaces; and,
a second heptatonic region comprising a third plurality of heptatonic operational surfaces;
wherein the chromatic region is positioned between the first heptatonic region and the second heptatonic region; and,
wherein the first plurality of heptatonic operational surfaces, the second plurality of heptatonic operational surfaces, and the third plurality of heptatonic operational surfaces are connected and not raised; and
wherein each operational surface is, and any connected operational surface is, configured so that all parts depress in unison regardless of the location of pressing; and,
wherein the first plurality of heptatonic operational surfaces comprise a first length, the operational surfaces in the chromatic region comprise an average width and the first length is less than three times that average width.

15. The keyboard of claim 14, wherein the operational surfaces in the chromatic region comprise keys of two colors such that in the chromatic region no key lies next to another key of the same color.

16. The keyboard of claim 14, wherein the plurality of pentatonic operational surfaces and the second plurality of heptatonic operational surfaces occupy locations spaced equally along the lateral axis.

* * * * *